Figure 1:
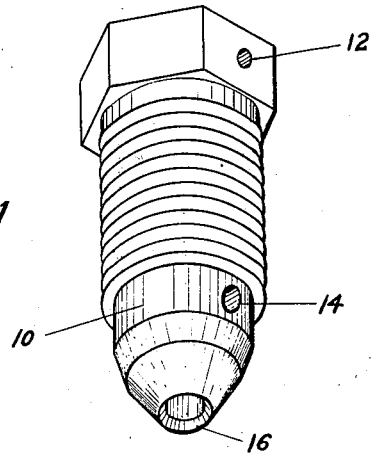

Sept. 7, 1943.  C. O'DANIEL  2,329,078

BREATHING APPARATUS

Filed Dec. 4, 1940

INVENTOR
CLARENCE O'DANIEL
BY
Roy M. Eilers
ATTORNEY

Patented Sept. 7, 1943

2,329,078

UNITED STATES PATENT OFFICE 2,329,078

BREATHING APPARATUS

Clarence O'Daniel, Richmond Heights, Mo., assignor to Century Electric Company, St. Louis, Mo., a corporation of Missouri Application December 4, 1940, Serial No. 368,479

2 Claims. (Cl. 220—44)

This invention relates to improvements in "breathing" apparatus for gear cases. More particularly, the invention relates to improvements in compact and simple "breathing" apparatus for gear cases.

It is an object of the present invention to provide a simple and compact "breathing" apparatus for gear cases.

Various forms of "breathing" apparatus for gear cases have been known and used for many years. Most of these forms have operated satisfactorily under most conditions. Under some conditions, however, the operation of the present forms of "breathing" apparatus has not been entirely satisfactory. "Breathing" apparatus is used on gear cases to maintain the air pressure therein at the approximate level of the pressure of the atmosphere surrounding the gear case. Whenever a gear train is started from rest and is operated for a time, a heating of the gears and the lubricant ensues. This heating effect is communicated to the air in the gear case, and causes the air to become quite warm. The heating of the air in the casing will tend to increase the volume of the air. Since the air is confined by the gear casing, the heating will create a pressure inside of the casing. This pressure will tend to force lubricant out of the casing along the shafts. Although oil or grease seals may be installed in the gear case, they will not completely prevent the escape of lubricant. Oil or grease seals are efficacious only where the pressure on both sides of the seal is substantially equal. Where a difference of pressure between the two sides of the seal exists, the difference of pressure will constantly tend to force lubricant through the seal. Under such circumstances, it is exceedingly difficult to prevent the escape of lubricant from the gear case. To relieve air pressure in the casing and thereby keep oil leakage at a minimum, some apparatus must be provided which will permit air to leave the casing, but will prevent any oil from leaving the casing. Such apparatus is known to those skilled in the art as "breathing" apparatus. This apparatus will permit air to flow freely into and out of the gear casing, but it will prevent any oil from flowing from the casing. The present forms of "breathing" apparatus consist of vertical pipes that have baffles therein, or small poppet valves in the gear casing. The vertical vent pipes with the baffles work very well. These pipes are usually rather long and have baffles located therein at different levels to take care of the excessive splashing of oil. The baffles keep the oil from splashing up into the vent holes at the top of the pipe. This type of breathing apparatus is very useful on internal combustion engines where a great deal of air may be "breathed" by the engine, but this type is not suited for use on small gear cases where compactness is necessary. The "breathing" apparatus usually employed on small gear cases is a small poppet valve that opens in response to the air pressure in the case. This form of "breathing" apparatus is not entirely satisfactory because a few drops of oil usually escape whenever the valve opens. This is objectionable since this oil must be replenished to secure complete protection for the moving parts. The invention obviates this objection by providing a "breathing" plug for gear cases of simple and compact construction that prevents the escape of oil therethrough.

Other objects and advantages of the invention will appear from the drawing and accompanying description.

A preferred form of the invention is shown and described in the drawing and accompanying description but it is to be understood that the drawing and accompanying description do not limit the invention and the invention will be defined by the appended claims.

Figure 2:
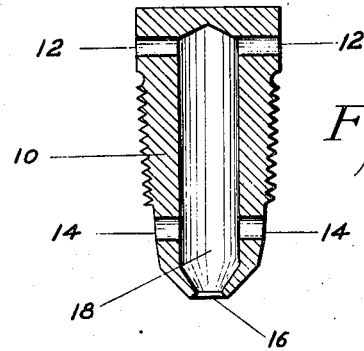

In the drawing, Fig. 1 is a perspective view of a "breathing" plug that is made in accordance with the principles of the invention, and Fig. 2 is a cross-sectional view of the "breathing" plug shown in Fig. 1.

Referring to the drawing in detail, a "breathing" plug made in accordance with the principles of the invention is denoted by the numeral 10. This plug is preferably threaded so that it may be fitted tightly in a threaded hole in the gear case. The plug 10 has a number of holes 12, 14, and 16 therethrough at different levels. The holes 12 are at the top of the "breathing" plug 10 and are, therefore, external to the gear case. The holes 14 are in the lower portion of the plug 10 and are positioned in the interior of the gear case whenever the plug 10 is screwed into place. The hole 16 is in the bottom of the plug 10 below the holes 14 and is also located in the gear case. The holes 12, 14, and 16 all communicate with a hollow section 18 in the center of the plug 10. The hole 16 in the bottom of the plug 10 has a smaller area than the hollow section 18. Such a design may be effectuated by bending the lower end of the plug in a cone-shaped die.

When the gears in the gear case are started, the air will gradually become heated and will flow through openings 14 into the hollow section 18 of plug 10. As the air in the gear case continues to expand, the air in the hollow section 18 of the plug 10 will move out into the atmosphere surrounding the gear casing through openings 12 in the top of the plug. As the gears and the lubricant in the gear case get warm, the lubricant will flow more freely and may be splattered onto the plug 10. Where this is the case, lubricant may pass through the holes 14 or 16 into the hollow section 18. There the oil will separate from the air and will drop to the bottom of the hollow section 18. The oil that falls to the bottom of the hollow section will drain out of the hole 16. The size of the hole 16 is preferably made small enough that the surface tension of the oil will be sufficient to hold one drop of oil in the opening. This drop of oil may be forced out of the opening 16 by a splash of oil, but the drop will retard the speed of the oil, so that it will not splash up to the level of the holes 12. This oil will then drop down to the bottom of the plug, will run out the opening 16 and again leave a drop to seal the opening. After the plug has once been used, it will always have a drop of oil to seal the hole 16. Air may enter the hollow section 18 of plug 10 freely through holes 14. Any oil that enters through the holes 14 will drop to the bottom of the plug and run out through hole 16. Since the holes 14 are horizontal, and since hole 16 is sealed by a drop of oil, no direct unimpeded path is provided from any of the holes 14 and 16 to holes 12. This prevents the escape of oil though the plug during the operation of the gears in the case, although it permits the free entry and exit of air into and from the gear case.

It is often desirable to fill a gear casing with lubricant before it is shipped to the consumer. Such a procedure avoids the necessity of servicing the equipment by the consumer before it is used. To be able to fill the gear casing with lubricant and ship it to a consumer, the gear casing must be oil tight. Where the gear casing is provided with breathing apparatus, some means must be provided to make the breathing apparatus oil tight during shipment. The invention provides such a means to permit the shipment of a gear casing filled with lubricant. This means may consist of a cotter key that extends through the holes 12 in the plug, and is coated with a sealing material such as wax. The wax cooperates with the cotter key to make the plug air-tight during shipment, and is preferably of such a consistency that the key may be withdrawn by the customer to render the plug operable as a breathing plug.

The holes 12 are preferably made small enough that water cannot be splashed into the hollow portion of the plug. Where the plug is to be used on automotive equipment, it may be so threaded that the holes 12 will be on a line that is transverse to the direction of travel of the automotive equipment. Such an arrangement will permit the operation of the automotive equipment in wet weather, and may permit the fording of creeks or rivers by the automotive equipment without an impairment in the lubrication of the equipment.

Whereas a preferred embodiment of the invention has been shown and described, it is obvious to those skilled in the art that various changes and alterations may be made in the form of the invention without altering its scope.

What I claim is:

1. A "breathing" plug for gear casings comprising a plug, a hollow section in said plug that is disposed axially thereof, a conical recess in said plug that communicates with and forms the closed upper portion of said hollow section, a hole in said plug that is below said conical recess and connects the hollow section of the plug with the atmosphere external to the gear casing, said hole having its axis substantially perpendicular to the axis of the hollow section of the plug, an opening in said plug connecting the hollow section of the plug with the atmosphere in the gear casing, and a tapered opening that forms the bottom of said hollow section and connects the hollow section of the plug with the atmosphere in the gear casing, said tapered opening being dimensioned and arranged so the oil in the hollow section of the plug can flow down to the small diameter of the tapered opening and seal it, said hole and said openings being arranged to cooperate with the said oil to obviate a straight-line unobstructed path through the hollow section from the interior of the casing to the exterior of the casing, said conical recess being arranged so any oil striking it will be deflected inwardly of said hollow section.

2. A "breathing" plug for gear casings comprising a plug, a hollow section in said plug that is disposed axially thereof and has a closed upper portion, a hole in said plug below said closed upper portion that connects the hollow section of the plug with the atmosphere external to the gear casing, said hole having its axis substantially perpendicular to the axis of the hollow section of the plug, an opening in said plug connecting the hollow section of the plug with the atmosphere in the gear casing, and a tapered opening that forms the bottom of said hollow sections and connects the hollow section of the plug with the atmosphere in the gear casing, said tapered opening being dimensioned and arranged so the oil in the hollow section of the plug can flow down to the small diameter of the tapered opening and seal it, said hole and said openings being arranged to cooperate with the said oil to obviate a straight-line unobstructed path through the hollow section from the interior of the casing to the exterior of the casing.

CLARENCE O'DANIEL.